United States Patent [19]

Gambrell

[11] 4,089,805

[45] May 16, 1978

[54] PROCESS FOR PREPARING A GASIFORM HYDROCARBON FUEL FROM HYDROCARBON FUEL OIL

[75] Inventor: Lawrence Mitchell Gambrell, Houston, Tex.

[73] Assignee: Allied Chemical Corporation, Morristown, N.J.

[21] Appl. No.: 758,986

[22] Filed: Jan. 13, 1977

Related U.S. Application Data

[63] Continuation-in-part of Ser. No. 549,641, Feb. 13, 1975, abandoned.

[51] Int. Cl.$^2$ ............................ C01B 2/14; C01B 2/16; F23D 11/44
[52] U.S. Cl. ................................. 252/373; 48/214 A; 48/215; 431/11
[58] Field of Search ................... 252/373; 48/214, 215; 431/3, 4, 11, 12, 163

[56] References Cited

U.S. PATENT DOCUMENTS

| | | | |
|---|---|---|---|
| 1,466,250 | 8/1923 | Reschke | 431/163 |
| 1,719,397 | 7/1929 | Edwards | 431/163 |
| 1,791,209 | 2/1931 | Hunneman et al. | 208/363 |
| 1,818,901 | 8/1931 | Mallery | 431/4 |
| 1,971,787 | 8/1934 | Koestner et al. | 431/163 |
| 2,048,140 | 7/1936 | Renfrew et al. | 208/362 |
| 2,065,619 | 12/1936 | Shinkle | 208/363 |
| 2,676,156 | 4/1954 | Bailey | 252/373 |
| 3,071,453 | 1/1963 | James | 252/373 |
| 3,264,066 | 8/1966 | Quartulli et al. | 252/373 |
| 3,441,393 | 4/1969 | Finneran et al. | 252/373 |
| 3,664,802 | 5/1972 | Garwood | 431/3 |
| 3,749,318 | 7/1973 | Cottel | 431/4 |
| 3,958,951 | 5/1976 | Woebcke et al. | 252/373 X |

*Primary Examiner*—Howard T. Mars
*Attorney, Agent, or Firm*—Michael S. Jarosz

[57] ABSTRACT

A process for preparing a gasiform hydrocarbon fuel from a hydrocarbon fuel oil, and maintaining same in such form into a gasiform burner, which comprises:

(a) partially vaporizing a liquid hydrocarbon fuel oil having a gravity of about 10°–50° A.P.I. at a temperature of 350°–675° F. in the presence of 5–90 percent by weight of non-oxidizing gas based on the weight of the vaporized portion of said hydrocarbon fuel oil, thereby producing a gasiform hydrocarbon fuel and a liquid residue, said gasiform hydrocarbon fuel consisting essentially of said vaporized liquid hydrocarbon and said non-oxidizing gas;

(b) separating said gasiform hydrocarbon from said liquid residue; and (c) superheating said gasiform fuel to maintain said gasiform fuel in the vapor state unitl it is burned, and (d) thereafter burning said gasiform fuel in said gasiform burner.

27 Claims, 1 Drawing Figure

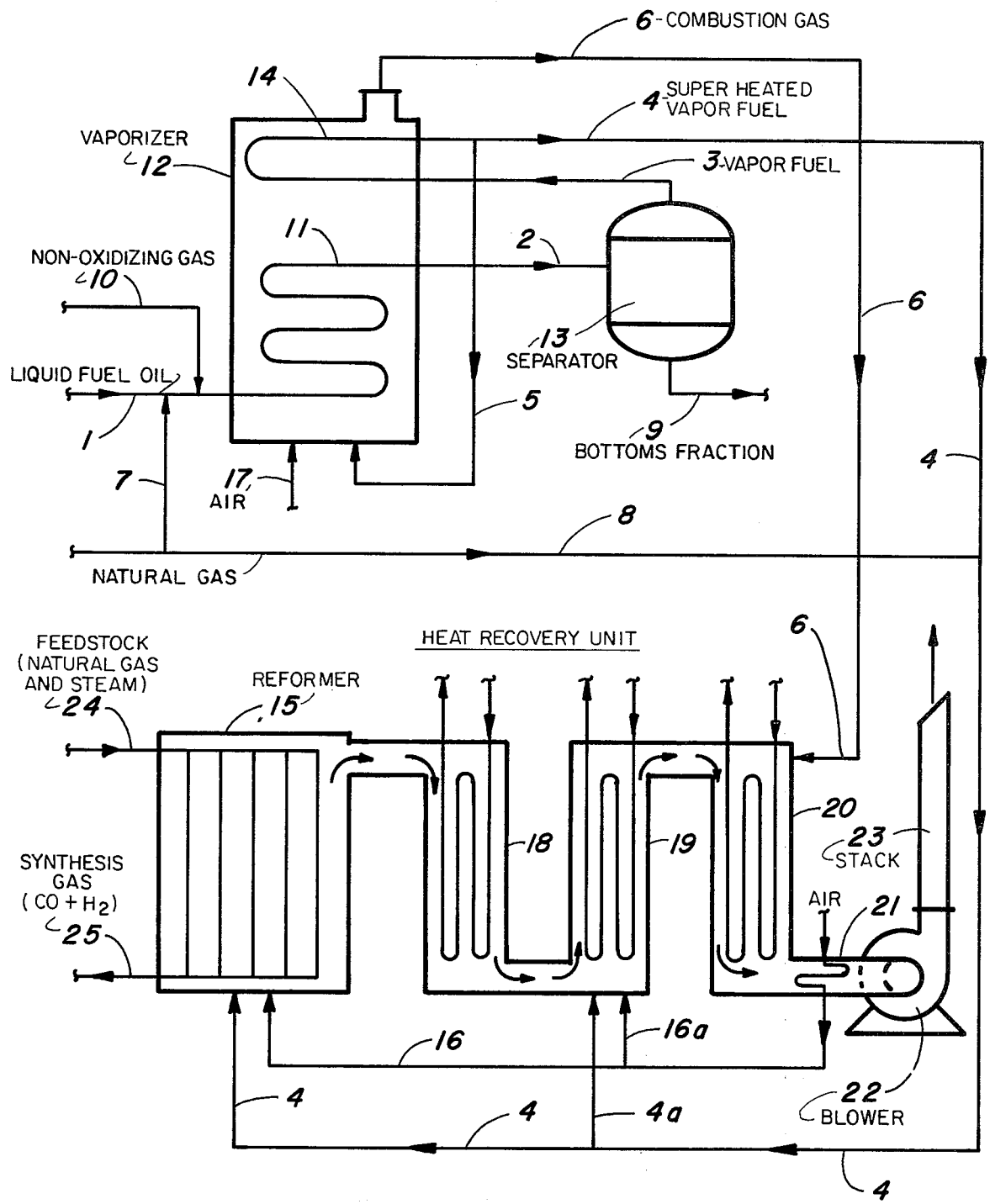

PROCESS FOR PREPARING A GASIFORM HYDROCARBON FUEL FROM HYDROCARBON FUEL OIL

CROSS-REFERENCES TO RELATED APPLICATIONS

This application is a continuation-in-part of application Ser. No. 549,641 now abandoned, filed Feb. 13, 1975.

BACKGROUND OF THE INVENTION

1. Field of the Invention

This invention relates to production of a gasiform hydrocarbon fuel. More particularly, it relates to preparing a gasiform hydrocarbon fuel from a hydrocarbon fuel oil having a gravity of about 10°-50° A.P.I., and maintaining same in such form into a gasiform burner. In one of its more specific aspects, it is concerned with the production of a gasiform hydrocarbon fuel suitable for burning in reforming furnaces used for the production of synthesis gas.

2. Description of the Prior Art

A national dilemma exists as a result of a diminishing supply of natural gas and an increasing demand for it. The impact of the gas crisis is being felt nationwide in rising prices, in governmental regulations with respect to the consumption of natural gas, and in prohibitions against the use of natural gas in future industrial construction. It is imperative that alternate sources of low-cost gaseous heating fuels be developed.

U.S. Pat. No. 3,561,895 to H. D. Michelson is directed to a method for control of fuel gas combustion. Inspirated air to inspirating type burners is maintained constant when one vapor fuel, e.g., natural gas, is changed for another, by heating or cooling the fuel in response to density variation, and supplementally by adding enriching or diluting gases. Preferred fuels for said method are light hydrocarbons; however, such fuels are not economic for use in industrial furnaces, as compared with natural gas or fuel oils.

It has long been known to pyrolyze and/or partially oxidize hydrocarbon fuel oils into a high heating value "oil gas" or into low heating value gas containing carbon monoxide and nitrogen. However, neither of these gases is interchangeable with natural gas. More recently, patents have issued on methods for preparing from hydrocarbon oils, or residuals, a fuel gas which has essentially the same heating value as natural gas.

U.S. Pat. No. 3,712,800 to A. H. Schutte discloses converting residual oils into a fuel gas having a heating value of about 950 to 1,000 B.T.U. per standard cubic foot. The residual oil containing one or more metallic modifiers as catalysts (which may be naturally occurring in the oil or added thereto) is pyrolyzed in the presence of small amount of steam at 1,000° to 1,400° F. and pressures of 5 to 30 psig., and from the products of the pyrolysis a fuel gas is separated. This fuel gas is a mixture of methane, hydrogen and ethane/ethylene.

U.S. Pat. No. 3,784,364 to W. L. Slater et al. discloses production of fuel gas having a heating value between 150 and 1,000 B.T.U. per standard cubic foot. The gas is prepared by subjecting a hydrocarbon oil to partial combustion at a temperature of about 1,300° to 1,600° F. using air as the oxidizing medium and injecting additional hydrocarbon oil into the hot partial combustion products.

U.S. Pat. No. 3,838,994 to C. L. Aldridge discloses conversion of heavy hydrocarbons to a methane rich gas product by contact with steam in the presence of a non-molten particulate alkali metal containing catalyst at pressures greater than 200 psig. and average temperatures between 1,000° and 1,500° F. An oxygen-containing gas may be introduced into the reaction mixture to provide a portion of the heat requirement.

U.S. Pat. No. 3,928,800 to E. T. Child et al. is directed to production of a methane-rich fuel gas from high-sulfur hydrocarbonaceous fuel. The high sulfur hydrocarbonaceous fuel is gasified by partial oxidation with substantially pure oxygen at about 1,700° to 3,100° F. and a pressure of 1 to 250 atmospheres to produce a process gas stream which is cooled, cleaned and subjected to catalytic methanation over a sulfur-resistant catalyst.

In prior processes for production of gaseous fuels involving pyrolysis and/or partial oxidation of hydrocarbon oil at temperatures of 1,000° F. or higher, from about 0.1 to about 10 weight percent, based on the hydrocarbon feed, of entrained particulate carbon is produced due to cracking of the hydrocarbon oil. Solid carbonaceous deposits form downstream from the reaction zone on the surfaces of vessels, lines, and heat exchangers. This entrained particulate carbon may be separated and recovered from the gas stream by known scrubbing and extraction processes but disadvantages of carbon recovery processes include the high cost of equipment and materials, and the operation of said recovery processes. Therefore, it would be desirable to provide a process which eliminates cracking of the hydrocarbon fuel oil to form entrained particulate carbon. Clearly, such process should avoid the prior art pyrolysis and/or partial oxidation of the hydrocarbon fuel oil.

SUMMARY OF THE INVENTION

It is a principal object of this invention to provide a continuous economical process for producing a gasiform hydrocarbon fuel that is directly substitutable for natural gas in industrial furnaces having burners designed for burning natural gas.

Another object of this invention is to provide a simple process for producing a gasiform hydrocarbon fuel substantially free from entrained particulate carbon.

Another object of this invention is to provide a process for producing from a hydrocarbon fuel oil containing pollutant and corrodent impurities, a clean gasiform hydrocarbon fuel suitable for burning in industrial furnaces without corrosion, soot, slagging or pollution problems.

In accordance with the present invention, we provide a process for preparing a gasiform hydrocarbon fuel from a hydrocarbon fuel oil, and maintaining same in such form into a gasiform burner, which comprises:

(a) partially vaporizing a liquid hydrocarbon fuel oil having a gravity of about 10°-50° A.P.I. at a temperature of 350°-675° F. in the presence of 5-90 percent by weight of non-oxidizing gas based on the weight of the vaporized portion of said hydrocarbon fuel oil, thereby producing a gasiform hydrocarbon fuel and a liquid residue, said gasiform hydrocarbon fuel consisting essentially of said vaporized liquid hydrocarbon and said non-oxidizing gas;

(b) separating said gasiform hydrocarbon from said liquid residue;

(c) superheating said gasiform fuel to maintain said gasiform fuel in the vapor state until it is burned; and (d) thereafter burning said gasiform fuel in said gasiform burner.

The term non-oxidizing gas, as used herein, will refer to any gas that does not oxidize the hydrocarbons used in the process under the stated conditions of the process. Preferably, the non-oxidizing gas is selected from the group consisting of steam, natural gas and mixtures thereof.

Except in unusual and relatively unimportant circumstances, the only commercial liquid fuels sufficiently cheap for use in the present invention are certain fractions of petroleum oil. Accordingly, the term hydrocarbon fuel oil or fuel oil, as used herein will refer to these materials only.

The petroleum refiner uses crude oil as his raw material. This material consists of a series of hydrocarbons varying from dissolved gases to heavy, nearly solid compounds. Certain fractions of this crude petroleum which may be separated by simple distillation will have the necessary properties for use as fuel oil. The petroleum refiner also practices forms of destructive distillation which are called either thermal or catalytic cracking. In these processes some hydrocarbons suitable for fuel oil are also produced. Fuel oils as received from the refiner may not be homogeneous and may contain considerable water and salts in suspension.

In addition to sulfur, many fuel oils contain trace quantities of mineral impurities such as vanadium, sodium, calcium, magnesium and iron. If such oil is burned in a furnace having steel tubes, e.g., a reformer furnace, even with the best metallurgy available, the vanadium oxides will attack the tubes resulting in rapid failure from pitting attack. In cases where sodium is present, sodium oxides formed on combustion of the fuel oil dissolve or "flux" the protective oxide film on the tubes, thereby greatly accelerating attack by the aforementioned vanadium oxides. Further, in heat recovery operations, these minerals fuse on heat recovery surfaces, forming deposits which retard heat transfer and increase rate of soot formation. It is therefore an important contribution to this art that the present invention overcomes these problems.

In accordance with the present invention, the gravity of the hydrocarbon fuel oil in terms of degrees A.P.I. is determined. Determination can be made by a hydrometer graduated in terms of specific gravity, but it is preferably made with a hydrometer carrying an arbitrary scale termed "Degrees A.P.I". The latter is defined by:

$$\text{Degrees A.P.I.} = \frac{141.5}{\text{specific gravity } \frac{60°\text{F.}}{60°\text{F.}}} - 131.5$$

In making tests, it is advisable to refer to Petroleum Products and Lubricants, Am. Soc. Testing Materials Rept. Comm. D2. This report is issued annually and contains standard methods for determination.

BRIEF DESCRIPTION OF THE DRAWING

The accompanying drawing diagrammatically illustrates one method of carrying out the operation of the present invention.

DESCRIPTION OF THE PREFERRED EMBODIMENTS

The preferred process of this invention may be stated as follows: A process for preparing a gasiform hydrocarbon fuel from a hydrocarbon fuel oil, and maintaining same in such form into a gasiform burner, which comprises:

(a) partially vaporizing about 25-75 percent by weight of a liquid hydrocarbon fuel oil having a gravity of about 30°-40° A.P.I. at a temperature of 350°-675° F. in the presence of 8-30 percent by weight of non-oxidizing gas selected from the group consisting of natural gas, steam and mixtures thereof, based on the weight of the vaporized portion of said hydrocarbon fuel oil, thereby producing a gasiform hydrocarbon fuel and a liquid residue, said gasiform hydrocarbon fuel consisting essentially of said vaporized liquid hydrocarbon and said non-oxidizing gas;

(b) separating said gasiform hydrocarbon from said liquid residue;

(c) superheating said gasiform fuel to maintain said gasiform fuel in the vapor state until it is burned, and (d) thereafter burning said gasiform fuel in said gasiform burner.

In one of its more specific aspects, the present invention is concerned with the production of a gasiform fuel suitable for burning in reforming furnaces used for the manufacture of synthesis gas, e.g., feed gas for the synthesis of ammonia.

The synthesis of ammonia from hydrocarbons, steam and air has become of increasing importance in recent years. Natural gas is generally used as the hydrocarbon from which hydrogen is generated for the ammonia synthesis reaction. In the usual commercial process, natural gas, after treatment for removal of sulfur compounds, is mixed with steam and passed over a nickel oxide catalyst at a temperature of about 1,200°-1,600° F. in externally heated furnace tubes known as the primary reformer. The heated furnace tubes are normally heated by means of burners equipped to burn natural gas. The principal reactions occurring in the primary reformer are:

$$CH_4 + H_2O \rightarrow CO + 3H_2$$

$$CO + H_2O \rightarrow CO_2 + H_2$$

In the conventional commercial process, the effluent gas from the primary reformer is mixed with air in amount sufficient to supply the nitrogen required in the subsequent ammonia synthesis. The resulting mixture is supplied to a secondary reformer containing nickel oxide as catalyst. In the secondary reformer, oxygen from the air combines with a portion of the hydrogen, producing water vapor and nitrogen:

$$\text{Air } (N_2 + O_2) + 2H_2 \rightarrow N_2 + 2H_2O$$

Carbon oxides are present in the effluent from the secondary reformer, and the effluent is treated for the removal of both carbon monoxide and carbon dioxide to obtain relatively pure hydrogen and nitrogen as ammonia synthesis feed gas.

To produce ammonia, the purified gas is compressed to the desired reaction pressure, e.g., 5,000 psig., and passed at a suitable reaction temperature, e.g., 950° F., over an ammonia synthesis catalyst, e.g., magnetic iron oxide promoted with potassium and aluminum oxides and subsequently reduced to metallic iron.

The availability of large natural gas reserves coupled with development of the above-described hydrogen manufacture via high-temperature catalytic steam reforming of hydrocarbons has led to a situation where almost all domestic ammonia and hydrogen-dependent products are manufactured in plants fed and fueled by natural gas. However, with diminishing reserves of natural gas, there is presently a strong effort toward conversion of existing plants from natural gas to oil as the source of fuel. Unfortunately, most hydrocarbon fuel oils contain impurities such as sulfur, vanadium and sodium which result in intolerably high corrosion and/or pollution rates when used in existing plants for high-temperature catalytic steam reforming of hydrocarbons. Further, some of these fuels deposit slag and soot on heat transfer surfaces in the heat-recovery units making it necessary to periodically clean these surfaces.

Accordingly, it is important that the present invention provides a method for converting hydrocarbon fuel oils into a clean gasiform hydrocarbon fuel which is interchangeable with natural gas as fuel in existing reformer furnaces for the production of synthesis gas. Moreover, it will be apparent to those skilled in the art that the present invention provides an improved method for production of chemical products such as ammonia and methanol from synthesis gas with use of greatly reduced need for natural gas.

Referring to the drawing, liquid fuel oil is introduced into the system through line 1 together with non-oxidizing gas, i.e., steam or water through line 10 and/or natural gas through line 7. The fuel oil and non-oxidizing gas pass through heating coils 11 of a conventional vaporizer 12 where the outlet temperature is controlled within the range 350° to 675° F. to give the desired proportion of vapor and liquid passing through line 2 to a conventional separator 13. Preferably, the liquid fuel oil fed has a gravity of 20° to 40° A.P.I., and 25 to 75 percent by weight of this fuel oil is vaporized in vaporizer 12. Preferably, about 8 to 80 percent by weight of non-oxidizing gas based on the weight of the vaporized portion of the fuel oil is fed with the liquid fuel oil to the vaporizer. In separator 13, substantially all of the impurities present in the liquid fuel oil are contained in the liquid bottoms fraction. The substantially pure vapor fraction from separator 13 is passed through line 3 to heating coils 14 of vaporizer 12 where the vapor is superheated sufficiently to prevent down-stream condensation. Desirably, the vapor is superheated to a temperature 100° to 200° F. greater than the temperature in separator 13.

Following superheating, the fuel vapor is passed through line 4 to reformer 15 where it is burned in existing conventional gas burners (not shown) with preheated air fed through line 16. The fuel vapor is burned without vanadium or sodium attack on the tubes of the high-temperature reformer, which tubes are constructed of stainless steel, preferably 25% Cr-20% Ni stainless steel, to resist attack by the contained synthesis gas. Reformer 15 is a conventional reformer for production of synthesis gas 25 by reacting a feed stock 24 consisting of purified natural gas and steam, at a temperature above about 1,200° F. in contact with a catalyst effective for conversion of the hydrocarbon and steam directly into carbon monoxide and hydrogen, said reaction being carried out in externally heated stainless steel tubes.

A portion of the clean vapor fuel from line 4 is passed through line 5 to vaporizer 12 where it is burned with air fed through line 17 in conventional gas burners (not shown). Hot clean combustion gas from vaporizer 12 is passed through line 6 to conventional heat recovery units 20 and 21 for heat recovery.

Following combustion of the vapor fuel in reformer 15, the combustion gas is passed through conventional heat recovery units 18, 19, 20, 21 without significant corrosive attack or deposition of slag and soot deposits. A portion of the recovered heat may be used for steam generation for use in the process. After passing through the heat recovery units, the combustion gas is vented to the atmosphere by means of blower 22 and stack 23. Vapor fuel from line 4 can also be fed through line 4a and burned with air fed through line 16a to fuel utility steam boilers (not shown).

When a portion of the fuel requirement is available as natural gas, the natural gas can be injected through line 7 into line 1 in place of part or all of the steam or water fed through line 10, thereby decreasing the temperature required for oil vaporization and contributing to the heating value of the vaporized fuel passing from separator 13 into line 3. When full fuel requirement is available as natural gas, the vaporizer 12 can be by-passed and full fuel requirement supplied through line 8 to line 4.

The impure bottoms fraction in line 9 from separator 13 can be used in power generating or other process units designed to handle such fuels with efficient pollution abatement.

The following examples illustrate the present invention. In particular, Example 1 demonstrates an improved process for the production of synthesis gas by reacting a gasiform hydrocarbon with steam at a temperature above about 1,200° F. in a reforming reaction in contact with a catalyst effective for conversion of the hydrocarbon and steam directly into carbon monoxide and hydrogen under conditions such that said hydrocarbon is substantially completely converted with the steam into carbon monoxide and hydrogen, said reforming reaction being conducted in externally heated stainless steel furnace tubes heated by burners equipped to burn a gasiform hydrocarbon fuel, the improvement comprising preparing a gasiform fuel by partially vaporizing a liquid hydrocarbon fuel oil having a gravity of about 10°–50° A.P.I. at a temperature of 350°–675° F. in the presence of 5–90 percent by weight of steam based on the weight of the vaporized portion of said hydrocarbon fuel oil, and burning the resulting gasiform hydrocarbon fuel in said burners.

EXAMPLE 1

The fuel oil used in this example is a No. 2 fuel oil having a gravity of 34° to 39° A.P.I., containing trace amounts of vanadium and sodium and about 0.35 percent by weight of sulfur.

The test can be carried out in a multiunit fertilizer complex originally designed to burn natural gas fuel exclusively. In part, the test can be carried out in a unit for production of synthesis gas by reacting natural gas with steam at a temperature of about 1,200° to 1,600° F. in a reforming reaction in contact with a nickel oxide catalyst effective for conversion of the hydrocarbon and steam directly into carbon monoxide and steam under conditions such that the hydrocarbon is substantially completely converted with the steam. The reforming reation is conducted in a conventional reformer in externally heated stainless steel (25% Cr-20% Ni) furnace tubes heated by means of burners equipped to burn a gasiform fuel.

Referring to the drawing, the liquid fuel oil is fed into the vaporizer 12 through line 1 at a rate of 1,750 pounds per minute. The vaporizer is heated by burning about 78 pounds per minute of purified superheated overhead vapor from line 5. Steam is fed to vaporizer 12 through line 10 at the rate of about 85.5 pounds per minute, and the liquid-vapor oil stream exit vaporizer 12 is controlled at a temperature of 560 to 590° F. and pressure of 40 psig. The liquid-vapor oil stream is fed to separator 13 through line 2. The bottoms from separator 13 consist of about 863 pounds per minute of oil containing about 0.7 percent by weight of sulfur and substantially all of the mineral impurities originally present in the fuel oil supply. The bottoms are fed through line 9 to power units designed for such fuel. The purified vapor fraction from separator 13 substantially free from entrained particulate carbon, is passed through line 3 and heating oils 14 in vaporizer 12 to give about 975 pounds per minute of purified superheated oil vapor and steam having a temperature of about 750° F., which is distributed as follows. About 625 pounds per minute is passed through line 4 to reformer 15. About 78 pounds per minute is passed through line 5 to provide fuel for vaporizer 12, from which flue gas flows through line 6 to reformer heat recovery units 20 and 21. About 272 pounds per minute is fed to utility steam boilers (not shown) not equipped with soot blowing or pollution abatement equipment.

The present process can be successfully operated utilizing fuel oil in units originally equipped with burners designed for natural gas fuel; however, adjustment of steam in the vapor fuel to the burners is necessary in accordance with the present invention to prevent damage to the burners. This finding is especially important for reformers equipped with a multiplicity of burners where changing burners would entail extended interruption to operation and high equipment replacement costs. The present process is operated without pollution problems utilizing fuel oils containing sulfur and other impurities which normally form pollutants during combustion. The present invention is operated without significant corrosion of reformer tubes, using fuel oils containing mineral impurities, specifically, vanadium and sodium, which would normally corrode materials of construction (stainless steel) used in reformers operating above 1,200° F. The present process is successfully operated using fuel oils which if burned directly would cause slagging and soot deposition in the heat recovery sections of the reformer.

EXAMPLE 2

The procedure of Example 1 is followed, except that the amount of steam (or water) fed to the vaporizer is varied. The amount of steam used is critical because if less than about 5 percent by weight of steam (based on the weight of the vaporized portion of the hydrocarbon) is used, cracking of the hydrocarbon fuel occurs in the vaporizer and there is a strong tendency for the flames to go out in the burners. Also, deposits of carbon tend to form in the piping and heat recovery units. Use of more than 90 percent by weight of steam (based on the weight of the vaporized portion of the hydrocarbon) is uneconomical because cost of processing is increased and there is a marked reduction in the fuel value of the vapor formed. Generally, use of excess steam is not as critical to operation of the process as is use of too little steam; however, use of a large excess of steam does cause burner flames to go out.

EXAMPLE 3

This example demonstrates that natural gas can be utilized as the non-oxidizing gas in the process of this invention. Referring to the drawing, the procedure of Example 1 is followed except about 700 pounds per minute of natural gas is fed through lines 7 and line 1 to vaporizer 12. As in Example 1, the liquid fuel oil is fed into vaporizer 12 through line 1 at a rate of 1,750 pounds per minute. No steam is fed through line 10. The liquid-vapor oil stream exit vaporizer 12 is controlled at a temperature of about 390° F. and the pressure is 35 psig. The purified vapor fraction from separator 13, containing about 0.8 pound of natural gas per pound of oil vapor, is superheated to a temperature of 750°–800° F. in heating coils 14. The resulting gasiform hydrocarbon fuel is burned in conventional burners designed to burn natural gas; a clear, colorless flame is produced.

We claim:

1. A process for preparing a gasiform hydrocarbon fuel from a hydrocarbon fuel oil, and maintaining same in such form into a gasiform burner, which comprises:
    (a) partially vaporizing a liquid hydrocarbon fuel oil having a gravity of about 10°–50° A.P.I. at a temperature of 350°–675° F. in the presence of 5–90 percent by weight of non-oxidizing gas based on the weight of the vaporized portion of said hydrocarbon fuel oil, thereby producing a gasiform hydrocarbon fuel and a liquid residue, said gasiform hydrocarbon fuel consisting essentially of said vaporized liquid hydrocarbon and said non-oxidizing gas;
    (b) separating said gasiform hydrocarbon from said liquid residue;
    (c) superheating said gasiform fuel to maintain said gasiform fuel in the vapor state until it is burned, and
    (d) thereafter burning said gasiform fuel in said gasiform burner.

2. The process of claim 1 wherein 25–75 percent by weight of the hydrocarbon fuel oil is vaporized.

3. The process of claim 1 wherein 40–60 percent by weight of the hydrocarbon fuel oil is vaporized.

4. The process of claim 1 wherein the hydrocarbon fuel oil has a gravity of about 30°–40° A.P.I.

5. The process of claim 1 wherein the non-oxidizing gas is selected from the group consisting of steam, natural gas, and mixtures thereof.

6. The process of claim 5 wherein the hydrocarbon fuel oil is vaporized in the presence of 8–30 percent by weight of steam based on the weight of the vaporized portion of said hydrocarbon.

7. A process for preparing a gasiform hydrocarbon fuel from a hydrocarbon fuel oil, said gasiform hydrocarbon fuel being suitable for burning in a reforming furnace having externally heated stainless steel furnace tubes and burners equipped to burn natural gas as fuel, which comprises:
    (a) partially vaporizing a liquid hydrocarbon fuel oil having a gravity of about 10°–50° A.P.I. at a temperature of 350°–675° F. in the presence of 5–90 percent by weight of a non-oxidizing gas selected from the group consisting of steam, natural gas, and mixtures thereof, based on the weight of the vaporized portion of said hydrocarbon fuel oil, thereby producing a gasiform hydrocarbon fuel and a liquid residue, said gasiform hydrocarbon fuel consisting essentially of said vaporized hydrocarbon and said non-oxidizing gas;

(b) separating said gasiform hydrocarbon from said liquid residue;

(c) superheating said gasiform fuel to maintain said gasiform fuel in the vapor state until it is burned; and (d) thereafter burning said gasiform fuel in the burners of said reforming furnace.

8. In a process for the production of synthesis gas by reacting a gasiform hydrocarbon with steam at a temperature above about 1,200° F. in a reforming reaction in contact with a catalyst effective for conversion of the hydrocarbon and steam directly into carbon monoxide and hydrogen under conditions such that said hydrocarbon is substantially completely converted with the steam into carbon monoxide and hydrogen, said reforming reaction being conducted in externally heated stainless steel furnace tubes heated by burners equipped to burn a gasiform hydrocarbon fuel, the improvement comprising preparing a gasiform fuel by partially vaporizing a liquid hydrocarbon fuel oil having a gravity of about 10°–50° A.P.I. at a temperature of 350°–675° F. in the presence of 5–90 percent by weight of a non-oxidizing gas, based on the weight of the vaporized portion of said liquid hydrocarbon fuel oil, separating a gasiform hydrocarbon fuel from a liquid residue, superheating said gasiform hydrocarbon fuel and burning the resulting gasiform hydrocarbon fuel in said burners.

9. The process of claim 8 wherein 25–75 percent by weight of the hydrocarbon fuel oil is vaporized.

10. The process of claim 8 wherein the hydrocarbon fuel oil has a gravity of about 30°–40° A.P.I.

11. The process of claim 8 wherein the hydrocarbon fuel oil is vaporized in the presence of 8–30 percent by weight of said non-oxidizing gas, based on the weight of the vaporized portion of said hydrocarbon.

12. The process of claim 8 wherein the vaporized portion of the hydrocarbon fuel oil is superheated before it is burned.

13. In a process for the production of synthesis gas by reacting a gasiform hydrocarbon with steam at a temperature of about 1,200°–1,600° F. in a reforming reaction in contact with a nickel oxide catalyst effective for conversion of the hydrocarbon and steam directly into carbon monoxide and hydrogen under conditions such that said hydrocarbon is substantially completely converted with the steam into carbon monoxide and hydrogen, said reforming reaction being conducted in externally heated stainless steel furnace tubes heated by burners equipped to burn a gasiform hydrocarbon fuel, the improvement comprising preparing a gasiform fuel for use in said burners by vaporizing about 25–75 percent by weight of a liquid hydrocarbon fuel oil having a gravity of about 10°–50° A.P.I. and containing impurities selected from the group consisting of sulfur, vanadium and sodium, at a temperature of 350°–675° F. in the presence of 5–90 percent by weight of a non-oxidizing gas selected from the group consisting of steam, natural gas, and mixtures thereof, based on the weight of the vaporized portion of said liquid hydrocarbon fuel oil, separating a gasiform hydrocarbon fuel consisting of the vaporized portion of said liquid hydrocarbon fuel oil and said non-oxidizing gas, from the unvaporized portion of said liquid hydrocarbon fuel oil containing said impurities, superheating said gasiform hydrocarbon fuel, and burning the superheated gasiform hydrocarbon fuel in said burners.

14. The process of claim 13 wherein 40–60 percent by weight of the hydrocarbon fuel oil is vaporized.

15. The process of claim 13 wherein the hydrocarbon fuel oil has a gravity of about 30°–40° A.P.I.

16. The process of claim 13 wherein the hydrocarbon fuel oil is vaporized in the presence of 8–30 percent by weight of said non-oxidizing gas, based on the weight of the vaporized portion of said hydrocarbon.

17. In a process for the production of synthesis gas by reacting a gasiform hydrocarbon with steam at a temperature of about 1,200°–1,600° F. in a reforming reaction in contact with a nickel oxide catalyst effective for conversion of the hydrocarbon and steam directly into carbon monoxide and hydrogen under conditions such that said hydrocarbon is substantially completely converted with the steam into carbon monoxide and hydrogen, said reforming reaction being conducted in externally heated stainless steel furnace tubes heated by burners equipped to burn a gasiform hydrocarbon fuel, the improvement comprising preparing a gasiform fuel for use in said burners by vaporizing about 25–75 percent by weight of a liquid hydrocarbon fuel oil having a gravity of about 30°–40° A.P.I. and containing impurities selected from the group consisting of sulfur vanadium and sodium, at a temperature of 350°–675° F. in the presence of 8–30 percent by weight of a non-oxidizing gas selected from the group consisting of steam, natural gas, and mixtures thereof, based on the weight of the vaporized portion of said liquid hydrocarbon fuel oil, separating a gasiform hydrocarbon fuel consisting of the vaporized portion of said liquid hydrocarbon fuel oil and said non-oxidizing gas, from the unvaporized portion of said liquid hydrocarbon fuel oil containing said impurities, superheating said gasiform hydrocarbon fuel, and burning the superheated gasiform hydrocarbon fuel in said burners.

18. In a process for the production of synthesis gas by reacting a gasiform hydrocarbon with steam at a temperature above about 1,200° F. in a reforming reaction in contact with a catalyst effective for conversion of the hydrocarbon and steam directly into carbon monoxide and hydrogen under conditions such that said hydrocarbon is substantially completely converted with the steam into carbon monoxide and hydrogen, said reforming reaction being conducted in externally heated stainless steel furnace tubes heated by burners equipped to burn a gasiform hydrocarbon fuel, the improvement comprising preparing a gasiform fuel by vaporizing at least 25 percent by weight of a liquid hydrocarbon fuel oil having a gravity of about 10°–50° A.P.I. at a temperature of 350°–675° F. in the presence of 5–90 percent by weight of steam based on the weight of the vaporized portion of said hydrocarbon fuel oil, and burning the resulting gasiform hydrocarbon fuel in said burners.

19. The process of claim 18 wherein 25–75 percent by weight of the hydrocarbon fuel oil is vaporized.

20. The process of claim 18 wherein the hydrocarbon fuel oil has a gravity of about 30°–40° A.P.I.

21. The process of claim 18 wherein the hydrocarbon fuel oil is vaporized in the presence of 8–30 percent by weight of steam based on the weight of the vaporized portion of said hydrocarbon.

22. The process of claim 18 wherein the vaporized portion of the hydrocarbon fuel oil is superheated before it is burned.

23. In a process for the production of synthesis gas by reacting a gasiform hydrocarbon with steam at a temperature of about 1,200°–1,600° F. in a reforming reaction in contact with a nickel oxide catalyst effective for conversion of the hydrocarbon and steam directly into carbon monoxide and hydrogen under conditions such that said hydrocarbon is substantially completely converted with the steam into carbon monoxide and hydrogen, said reforming reaction being conducted in externally heated stainless steel furnace tubes heated by burners equipped to burn a gasiform hydrocarbon fuel, the improvement comprising preparing a gasiform fuel for use in said burners by vaporizing about 25–75 percent by weight of a liquid hydrocarbon fuel oil having a gravity of about 10°–50° A.P.I. and containing impurities selected from the group consisting of sulfur vanadium and sodium, at a temperature of 350°–675° F. in the presence of 5–90 percent by weight of steam based on the weight of the vaporized portion of said hydrocarbon fuel oil, separating a gasiform hydrocarbon fuel consisting of the vaporized portion of the hydrocarbon fuel oil and steam, from the unvaporized portion of the hydrocarbon fuel oil containing said impurities, superheating said gasiform hydrocarbon fuel, and burning the superheated gasiform hydrocarbon fuel in said burners.

24. The process of claim 23 wherein 40–60 percent by weight of the hydrocarbon fuel oil is vaporized.

25. The process of claim 23 wherein the hydrocarbon fuel oil has a gravity of about 30°–40° A.P.I.

26. The process of claim 23 wherein the hydrocarbon fuel oil is vaporized in the presence of 8–30 percent by weight of steam based on the weight of the vaporized portion of said hydrocarbon.

27. In a process for the production of synthesis gas by reacting a gasiform hydrocarbon with steam at a temperature of about 1,200°–1,600° F. in a reforming reaction in contact with a nickel oxide catalyst effective for conversion of the hydrocarbon and steam directly into carbon monoxide and hydrogen under conditions such that said hydrocarbon is substantially completely converted with the steam into carbon monoxide and hydrogen, said reforming reaction being conducted in externally heated stainless steel furnace tubes heated by burners equipped to burn a gasiform hydrocarbon fuel, the improvement comprising preparing a gasiform fuel for use in said burners by vaporizing about 25–75 percent by weight of a liquid hydrocarbon fuel oil having a gravity of about 30°–40° A.P.I. and containing impurities selected from the group consisting of sulfur vanadium and sodium, at a temperature of 350°–675° F. in the presence of 8–30 percent by weight of steam based on the weight of the vaporized portion of said hydrocarbon fuel oil, separating a gasiform hydrocarbon fuel consisting of the vaporized portion of the hydrocarbon fuel oil and steam, from the unvaporized portion of the hydrocarbon fuel oil containing said impurities, superheating said gasiform hydrocarbon fuel, and burning the superheated gasiform hydrocarbon fuel in said burners.

* * * * *